United States Patent [19]

Simonson, Sr.

[11] 4,406,270
[45] Sep. 27, 1983

[54] FUEL EXPANDER

[76] Inventor: William B. Simonson, Sr., 4226½ 1st Ave., Hibbing, Minn. 55746

[21] Appl. No.: 241,430

[22] Filed: Mar. 12, 1981

[51] Int. Cl.³ ............................................. F02M 31/00
[52] U.S. Cl. ...................................... 123/557; 165/51
[58] Field of Search ..................... 123/557; 165/51, 52

[56] References Cited

U.S. PATENT DOCUMENTS

| | | | |
|---|---|---|---|
| 916,003 | 3/1909 | Osborn | 123/557 |
| 1,267,185 | 5/1918 | Coffman | 123/557 |
| 1,318,265 | 10/1919 | Clemmensen | 123/557 |
| 4,091,782 | 5/1978 | Dunnam | 123/557 |
| 4,306,617 | 12/1981 | Lancaster | 123/557 |

FOREIGN PATENT DOCUMENTS

| | | | |
|---|---|---|---|
| 960534 | 1/1975 | Canada | 123/557 |
| 1025689 | 4/1953 | France | 123/557 |
| 343466 | 2/1931 | United Kingdom | 123/557 |

Primary Examiner—Ronald H. Lazarus
Attorney, Agent, or Firm—James E. Olds

[57] ABSTRACT

A fuel expander (10) is inserted into a heater hose (14), coolant is passed through tube member (12) to the heater inside the passenger compartment of the vehicle, or alternatively from the member (12) through diversion pipes (32), through valve (34), and back to the water pump on the engine. Fuel flows through a first expansion chamber (25), into a fuel expansion chamber (18), through a second expansion chamber (27) and then to the carburetor on the engine.

3 Claims, 2 Drawing Figures

FUEL EXPANDER

TECHNICAL FIELD

The device of this invention relates to the method and apparatus for the heating of gasoline in an expansion chamber by the engine coolant flowing through the heater hoses of an automotive engine to expand the gasoline and improve the fuel economy of the vehicle.

BACKGROUND OF THE INVENTION

Gasoline expanders are known in the art and have taken on many different conceptual approaches to provide heat to the fuel for expansion thereof, which heat is a by-product of the operation of the gasoline engine. Some systems involve the use of the exhaust gases from the engine to heat or vaporize the gasoline, but more common is utilization of the coolant liquid, utilized to cool the internal combustion engine, to expand the gasoline.

SUMMARY OF THE INVENTION

This invention relates to the method and apparatus of a fuel expander for a liquid cooled internal combustion engine wherein the fuel expander is inserted into a heater hose of a vehicle by cutting and clamping each cut end of the hose to opposite ends of the fuel expander, whereby the engine coolant normally going from the engine to the heater coils in the passenger compartment is passed through the fuel expander, which is believed to expand the gasoline in the fuel expander before it reaches the carburetor and thus improve the fuel economy of the vehicle. Exactly how the economy is improved may not be known by the inventor, but it is known that the economy is improved. Diversion pipes and a valve allows engine coolant to flow through the fuel expander when the coolant is stopped from flowing through the heater coils in the passenger compartment such as doing summer time use of the vehicle.

In addition to providing greater fuel economy, the design of the present invention provides an inexpensive apparatus that is readily adaptable to most any current tractor, automobile, or truck commonly being used which has a passenger heater and engine coolant.

BRIEF DESCRIPTION

The present invention will be described hereafter in the detailed description taken in conjunction with the following drawings, which like reference numerals refer to like elements throughout.

FIG. 1 is an elevational view looking at an illustrative internal combustion engine including the fuel expander of the present invention; and FIG. 2 is a schematic drawing showing the flow of the engine coolant and fuel through the fuel expander of the present invention.

DETAILED DESCRIPTION

Figure 1:
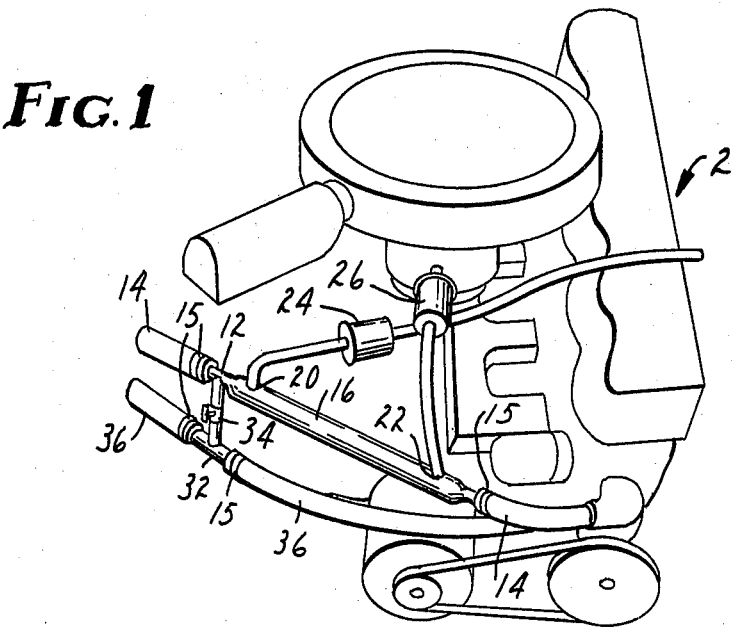

An improved fuel expander according to this invention is generally identified as 10. The fuel expander as shown in FIG. 1, has been installed on the illustrative internal combustion engine 2 by cutting the heater hose 14, removing a section of the heater hose 14, and inserting the fuel expander 10 in place of the removed hose and secured in place by hose clamps 15. The heater hose 36, which is the coolant return line from the heater coils in the passenger compartment of the vehicle, is also cut and a section removed allowing for the insertion of diversion pipe 32 which is also clamped and secured in place by clamps 15. A first housing 24 cylindrically shaped and closed on each end except for fuel inlets and outlets, which housing could include a fuel filter 28, allows the fuel or gasoline within the expander 10 to expand back into the first housing 24. Similarly, the second housing 26 similarly shaped as housing 24, and which could also include a fuel filter 28, allows for the fuel within the fuel expander 10 to additionally expand into the second housing 26.

As can be seen from FIG. 1, fuel from the fuel pump flows through the first housing 24, through the fuel expander 10, through the second housing 26 and to the carburetor of the engine. Engine coolant flows from the engine through the hose 14, through the fuel expander 10, continuing through the heater hose 14, through the heater coils inside the passenger compartment of the vehicle, and back through heater hoses 36 to the radiator or inlet side of the water pump on the engine. When the passenger heater is not being used and the flow of water is stopped at the passenger heater, the fuel expander 10 can still be used by opening valve 34 which would allow the coolant 4 to then flow from heater hose 14 through fuel expander 10, through diversion pipes 32 and back through heater hose 36 to the inlet side at the water pump.

Figure 2:
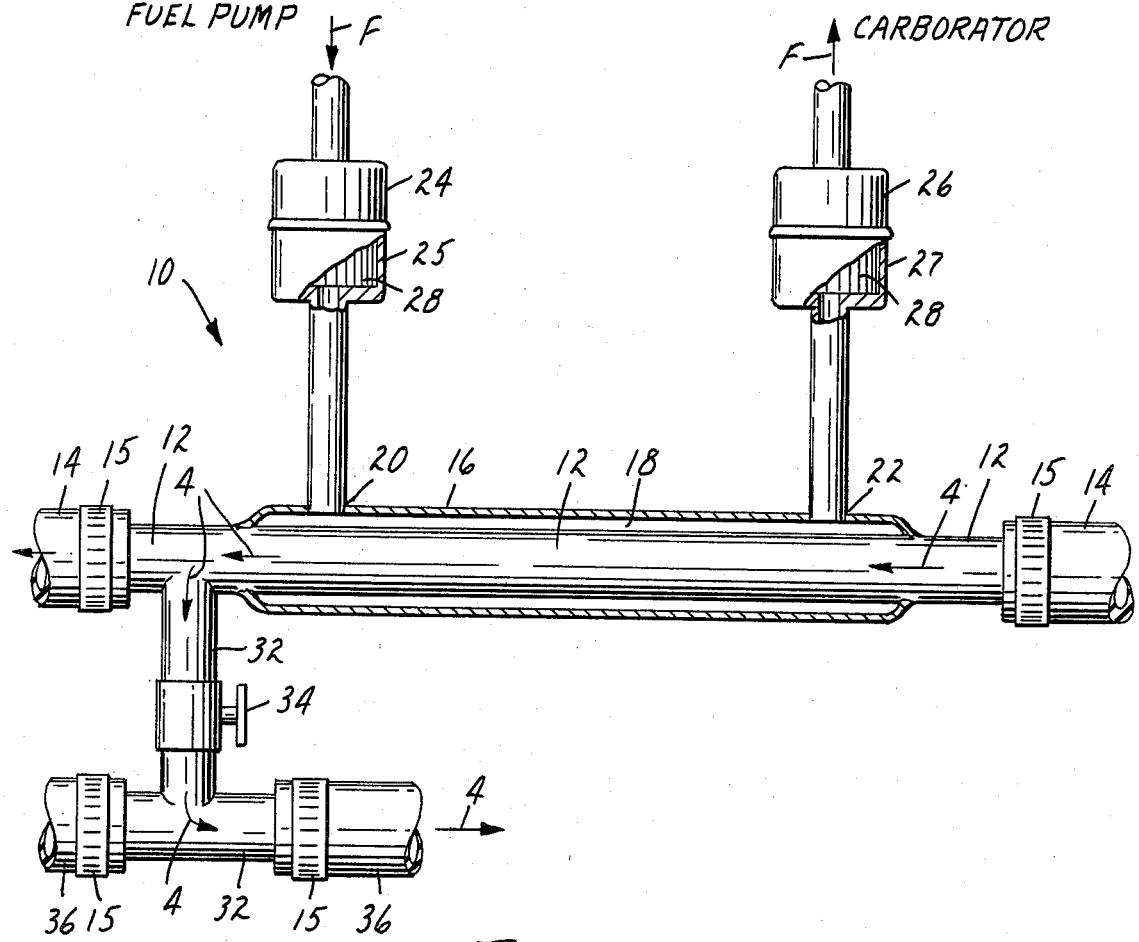

As shown in FIG. 2, the engine coolant, represented by arrow 4, goes through heater hose 14 secured to the elongate tubelike member 12 by clamp 15, and out the opposite end of the tubelike member 12, through hose 14 to the heating coils in the passenger compartment; or alternatively, the coolant from the member 12 could be diverted through the diversion pipes 32 through valve 34 and back through heater hose 36 to the inlet side of the water pump when the flow of coolant is stopped from going through the heater in the passenger compartment. Sealed near opposite ends and on the outer surface of the tubelike member 12, is the encircling elongate envelope 16, having an enlarged center portion to define a chamber 18, having a volume capacity of approximately one fluid ounce, through which will pass the fuel for the engine. The envelope 16 also includes a first tube 20 and second tube 22, sealed to the envelope 16, connected to a first housing 24 and a second housing 26 respectively. The first housing 24 defines a first expansion chamber 25, and similarly, the second housing 26 defines a second expansion chamber 27. In each expansion chamber may be included a fuel filter 28. Thus it should be apparent from FIGS. 1 and 2, fuel from the fuel pump goes through the first housing 24, through the first tube 20, into the chamber 18 where it is heated and expanded by the coolant of the engine, out through second tube 22, through second housing 26 and to the carburetor of the engine. As previously mentioned, the diversion pipes 32 and the valve 34 allow for the coolant 4 to flow through the fuel heater 10, through the diversion pipes 32 and valve 34, and back to the intake side of the water pump when the flow of the coolant water is stopped from flowing through heater coils inside the engine compartment by a coolant flow control valve adjacent to the heater coils.

Member 12, envelope 16, tube 20, tube 22, and pipes 32 are made from copper in the preferred embodiment. Housings 24 and 26 are made from a light guage steel but could also be made from copper.

Various modifications of this invention could be apparent to those skilled in this art. Thus, the scope of this invention is to be limited only by the appended claims.

What I claim my invention to be:

1. A fuel expander to provide greater fuel economy for a vehicle using a liquid cooled internal combustion engine, comprising:
   (a) an elongated tubelike member inserted into a heater hose of the vehicle by cutting and clamping each cut end of the hose to opposite ends of said member, to allow for engine coolant normally going from the engine to the heater coils in the passenger compartment to be passed through the elongated tubelike member;
   (b) an elongated envelope encircling said elongated tubelike member and sealed to the outer surface near each end of said tubelike member to define a fuel heating chamber encircling said elongated member;
   (c) said envelope including first and second tubes projecting from said envelope, said tubes located near opposite ends of said envelope and open to said fuel heating chamber;
   (d) a first housing defining a first expansion chamber and connected to said first tube to provide fuel communication from the fuel pump on the engine, through said first housing, through said first tube, through said envelope, through said second tube to the carburetor on the engine, said first expansion chamber allowing fuel in the fuel heating chamber of said envelope to expand into said first expansion chamber;
   (e) a second housing defining a second expansion chamber and connected to said second tube to provide fuel communication from said fuel heating chamber through said second tube, through said second expansion chamber to the carburetor of the engine, said second expansion chamber allowing fuel in the fuel heating chamber of said envelope to expand into said expansion chamber;
   (f) a bypass pipe connected to said elongated tubelike member and to a second heater hose of the vehicle; and
   (g) a bypass valve in said bypass pipe to selectively allow coolant to be passed through the elongated member, through the bypass pipe and valve and back to the engine without going through heater coils in the passenger compartment.

2. The apparatus of claim 1, comprising a first fuel filter in said first housing.

3. The apparatus of claim 2, comprising a second fuel filter in said second housing.

* * * * *